United States Patent [19]

Hassan et al.

[11] Patent Number: 5,792,818
[45] Date of Patent: Aug. 11, 1998

[54] PROCESS FOR HYDROLYZING MALEIC ANHYDRIDE COPOLYMERS

[75] Inventors: Mahmoud Hassan, Piscataway; Robert Mitchell, Somerset; Nagaraj Dixit, Plainsboro; Gary Durga, Edison; Marcus Bentley, Jersey City, all of N.J.

[73] Assignee: Colgate-Palmolive Company, New York, N.Y.

[21] Appl. No.: 795,534

[22] Filed: Feb. 5, 1997

[51] Int. Cl.$^6$ .......................................................... C08F 8/12
[52] U.S. Cl. ........................ 525/369; 525/327.8; 525/383
[58] Field of Search ........................................ 525/369, 383

[56] References Cited

U.S. PATENT DOCUMENTS

| 4,670,514 | 6/1987 | Burke | 525/369 |
| 5,292,517 | 3/1994 | Chang | 424/426 |

*Primary Examiner*—Bernard Lipman
*Attorney, Agent, or Firm*—Henry S. Goldfine

[57] ABSTRACT

A catalytic process for the hydrolysis of alkyl vinyl ether/maleic anhydride copolymers, involving a base catalyst.

6 Claims, No Drawings

PROCESS FOR HYDROLYZING MALEIC ANHYDRIDE COPOLYMERS

BACKGROUND OF THE INVENTION

1. Field of the Invention

The present invention relates to a catalytic process for hydrolyzing maleic anhydride copolymers and more particularly, to a process for the hydrolysis of an alkyl vinyl ether/maleic anydride copolymer.

2. The Prior Art

Lower alkyl vinyl ether/maleic anhydride (AVE/MA) copolymers, for example, copolymers of maleic anhydride with a $C_1-C_4$ alkyl vinyl ethers, such as methyl or ethyl vinyl ether, are known to the art and have been long recognized as water soluble ingredients for use in personal care, agricultural, medical and detergent compositions.

In certain applications the AVE/MA copolymer's anhydride ring must be hydrolyzed as an intermediate or final step in forming the desired water soluble copolymeric ingredient. Such a hydrolysis process is disclosed in U.S. Pat. No. 5,292,517, which discloses the formation of poly (methylvinylether/maleic acid) copolymer by hydrolyzing poly(methylvinylether/maleic anhydride) (MVE/MA) copolymer; wherein, the MVE/MA copolymer is dissolved in water heated to an elevated temperature (e.g. 194° F.) and agitated, the solution containing approximately 8 w/v % MVE/MA copolymer. Heating and agitation is continued for 30 minutes and thereafter cooled to about ambient temperature (e.g. about 77° F.) and the pH adjusted to about 9 using 0.1 N NaOH. The copolymer then is allowed to hydrolyze over a period of 24 hours. U.S. Pat. No. 5,292,517 further teaches that by varying the pH of the hydrolyzed MVE/MA copolymer solution, with 1.0 N HCl, a significant variance in the solution's viscosity may be effected; wherein, the lower the pH, the lower the viscosity of the solution.

The reaction rate of the MVE/MA copolymer hydrolysis process disclosed in U.S. Pat. No. 5,292,517 is relatively slow and as the final product is a basic sodium salt, the addition of an acid such as HCl is required to prepare an acidic or neutral product, when required. Accordingly, there is a need for an increase in the reaction rate of the hydrolysis of MVE/MA copolymer, and for a process that directly yields an acid or neutral product.

SUMMARY OF THE INVENTION

The present invention is directed to a low temperature process for the hydrolysis of AVE/MA copolymers having an enhanced reaction rate, which yields a clear viscous liquid acid product within 2 hours; wherein, there is added to a water dispersion of 5 to 26 weight percent of a AVE/MA copolymer, heated to 110° F. to 130° F., a small but effective catalytic amount of a base and the mixture agitated until the desired clear viscous liquid hydrolyzed product is obtained.

The preferred reaction process steps of the present invention involve agitation, rest (i.e. no agitation), homogenization and rest, repeated as necessary until the desired clear viscous liquid product is obtained. As the reactant mixture increases in viscosity during the reaction process, the rest intervals allow the viscosity to decrease, increasing the effectiveness of the dispersion of the reactants when the agitation/homogenization is begun again and accordingly decreasing the overall reaction time.

The alkyl vinyl ether/maleic anhydride copolymer used in the process of the present invention contains the alkyl vinyl ether and maleic anhydride monomers at a weight ratio of about 1:4 to about 4:1, and is preferably a MVE/MA copolymer having a molecular weight (M.W.) of from about 30,000 to about 1,000,000. These MVE/MA copolymers are commercially available under the Gantrez trademark from ISP Investments, Inc. These MVE/MA copolymers are also available from other commercial sources such as Polysciences and American Scientific Polymers.

The maintenance of a relatively low reaction temperature, in the order of about 110° F. to about 130° F. is critical to avoid chain degradation and the lower molecular weight of the MVE/MA copolymer associated with the hydrolyzed MVE/MA copolymer product of the prior art.

The quantity of base catalyst required in the process of the present invention is from about 0.1 to about 2.0% by weight of the total reaction solution into which it is added. Either an organic or inorganic base can be used as a catalyst. Typical organic bases are, as for example, monoethanolamine, diethanolamine, and triethanolamine (TEA). Typical inorganic bases are alkali and alkaline earth hydroxides, as for example, sodium hydroxide, potassium hydroxide, and calcium hydroxide. Sodium hydroxide is a preferred base catalyst.

The following example is further illustrative of the present invention, but it is understood that the invention is not limited thereto. All parts or percentages are by weight and all temperatures are in degrees F, unless specifically stated to be otherwise.

EXAMPLE

A series of MVE/MA copolymers were hydrolyzed according to the process of the present invention (designated "Processes A, B, C and D") by preheating and maintaining 171–174 grams of water in a beaker heated to 120° F. and dispersing therein 26 grams of MVE/MA copolymer and adding 2–3 grams of 50% NaOH solution. The mixture was stirred for 5 to 10 minutes and allowed to stand for 25 to 30 minutes without agitation. Thereafter, the dispersion was homogenized by agitating with a mechanical propeller type lab stirrer, allowed to stand 25 to 30 minutes without agitation, homogenized again, allowed to stand another 25 to 30 minutes without agitation and then agitated for an additional 5 minutes until a clear viscous liquid solution was obtained. The process conditions of Processes A-D are summarized in the Table, below.

For purposes of comparison, the procedure of Processes A-D was repeated wherein either a significantly greater concentration of MVE/MA copolymer was used, or NaOH was absent from the reaction mixture. These comparative process conditions are also summarized in the Table, below, designated as Processes E and F, respectively.

TABLE

| Quantity or Variable | Process A | Process B | Process C | Process D | Process E* | Process F* |
|---|---|---|---|---|---|---|
| MVE/MA Copolymer (gms.) | 26.0 | 26.0 | 26.0 | 26.0 | 52.0 | 26.0 |
| Water (gms.) | 172.0 | 171.5 | 171.0 | 170.5 | 143.0 | 174.0 |
| NaOH (50% Sol'n) (gms.) | 2.0 | 2.5 | 3.0 | 3.5 | 5.0 | 0 |
| Reaction Time (Hrs.) | 2.0 | 1.5 | 1.5 | 1.0 to 1.5 | 4.0 to 4.5 | 3.0 to 3.5 |

*Note: The procedure of both Processes E and F differed from that of Processes A–D in that additional agitation, rest, homogenization, rest, steps where required during the longer reaction time required.

Referring to the Table comparative Process F having no NaOH required substantively longer reaction time (i.e.

3.0–3.5 hours) than Processes A-D, which required 1.5–2.0 hours. It is further apparent from the Table that comparative Process E, where the concentration of MVE/MA copolymer in solution is significantly greater (i.e. 26% by weight versus 13% by weight in Processes A-D) the reaction time is significantly greater.

We claim:

1. A process for the hydrolysis of lower alkyl vinyl ether/maleic anhydride copolymers comprising dispersing the copolymer in water heated to a temperature of between about 110° to about 130° F., adding thereto a small but effective amount of a catalytic base catalyst to form a reactant mixture which is mixed until a clear viscous liquid hydrolyzed product is formed.

2. A process according to claim 1, wherein the quantity of lower alkyl vinyl ether/maleic anhydride is from 5 to 26 percent by weight of the reaction mixture.

3. A process according to claim 1, wherein the quantity of catalytic base in the reaction mixture is from about 0.1 to about 2% by weight.

4. A process according to claim 3, wherein the catalytic base is sodium hydroxide.

5. A process according to claim 1, wherein the alkyl vinyl ether/maleic anhydride copolymer is methyl vinyl ether/maleic anhydride.

6. A process according to claim 1, wherein the mixing of the reactant mixture is an agitation, followed by a rest, followed by a homogenization of the reactant mixture.

* * * * *